United States Patent [19]

Conley

[11] Patent Number: 5,223,702
[45] Date of Patent: Jun. 29, 1993

[54] METHOD AND APPARATUS FOR ROTATIONAL RATE DETERMINATION USING A STELLAR REFERENCE

[75] Inventor: Peter L. Conley, Woodland Hills, Calif.

[73] Assignee: Hughes Aircraft Company, Los Angeles, Calif.

[21] Appl. No.: 884,824

[22] Filed: May 18, 1992

[51] Int. Cl.⁵ .............................................. G01J 1/20
[52] U.S. Cl. .................... 250/203.6; 244/3.16
[58] Field of Search ............... 250/203.6, 216, 203.5, 250/578; 356/141, 152; 244/164, 181, 182, 176, 3.16, 3.18, 3.21

[56] References Cited

U.S. PATENT DOCUMENTS

| | | | |
|---|---|---|---|
| 3,443,100 | 5/1969 | Fried | 250/203.6 |
| 3,571,567 | 3/1971 | Eckermann | 250/203.6 |
| 4,740,681 | 4/1988 | Tsuno | 250/203.6 |
| 5,012,081 | 4/1991 | Jungwirth et al. | 250/203.6 |

Primary Examiner—David C. Nelms
Assistant Examiner—Que T. Le
Attorney, Agent, or Firm—Gordon R. Lindeen,III; Wanda Denson-Low

[57] ABSTRACT

A method and apparatus for determining the rate of rotation of a rotating satellite 10 utilizing an imaging device 12 located on the satellite. The imaging device takes a first celestial sphere image view 22 at a first point in time and takes a second celestial image view 26 at a second point in time. The difference between the first and second images 30, differentiated over the time between the taking of the first and second images, is used to determine the rate of rotation of the satellite 32.

17 Claims, 2 Drawing Sheets

METHOD AND APPARATUS FOR ROTATIONAL RATE DETERMINATION USING A STELLAR REFERENCE

BACKGROUND OF THE INVENTION

1. Field of the Invention

This invention relates generally to satellite positioning control systems, and more particularly to a satellite-based angular rate determination system and method.

2. Description of the Related Art

In the field of satellite positioning controls, continual, precise rate sensing is very important for precision satellite attitude control.

Currently, devices such as gyroscopes have been used in attitude control. However, mechanical gyroscopes have a limited life dictated by the life of the wheel suspension assembly and its sensitivity to influences such as temperature and vibration. Likewise, optical gyroscopes are limited by the life and stability of the light source, the resistance of the fiber or mirrors to ambient radiation, and other complex problems related to light and quantum limits.

In addition to gyroscopes, various forms of star sensors have been used to detect and control satellite attitude. For example, a static star sensor compares the stars seen over a relatively large area of space to a map of the universe, and calculates the direction of the sensor line of sight from the comparison of the image to the map. However, there are several limitations on this technology. First, the sensor field of view must be very large or the sensitivity of the sensor very high to obtain adequate information. Second, the brightness and position of the stars in the field of view must be compared to a very large catalog of information in order to decide which region of the heavens is in view. An alternative system, known as a tracker star sensor, follows the motion of a single star relative to the sensor base by rotating the sensor line of sight. The angle between the line of sight and the sensor base determines the base attitude. Such a system is limited by the fact that the device must be able to select a particular star.

It would therefore be advantageous to provide for a satellite attitude control system that is reliable, inexpensive and robust. It should be capable of determining angular rates without requiring the complicated hardware associated with a gyroscope. Likewise, any use of stellar references should not be dependent upon an extensive map of the universe or the ability to identify and track a single star.

SUMMARY OF THE INVENTION

It is therefore an object of the present invention to provide for a method and apparatus for determining the rate of rotation of a rotating satellite. The apparatus includes an imaging device, located on the satellite, for viewing a celestial sphere. At a first point in time, a first celestial sphere image is taken by the imaging device and stored temporarily. At a second point in time, a second celestial sphere image is taken by the imaging device, and this second image is compared with the stored first image. The difference between the first and second images, differentiated over the time between the taking the first and the second images, is used to determine the rate of rotation of the satellite.

BRIEF DESCRIPTION OF THE DRAWINGS

These and other objects and features of the present invention can be better understood by referencing the foregoing description of the presently preferred embodiment as well as the drawings in which.

DESCRIPTION OF THE PREFERRED EMBODIMENT

Figure 1:
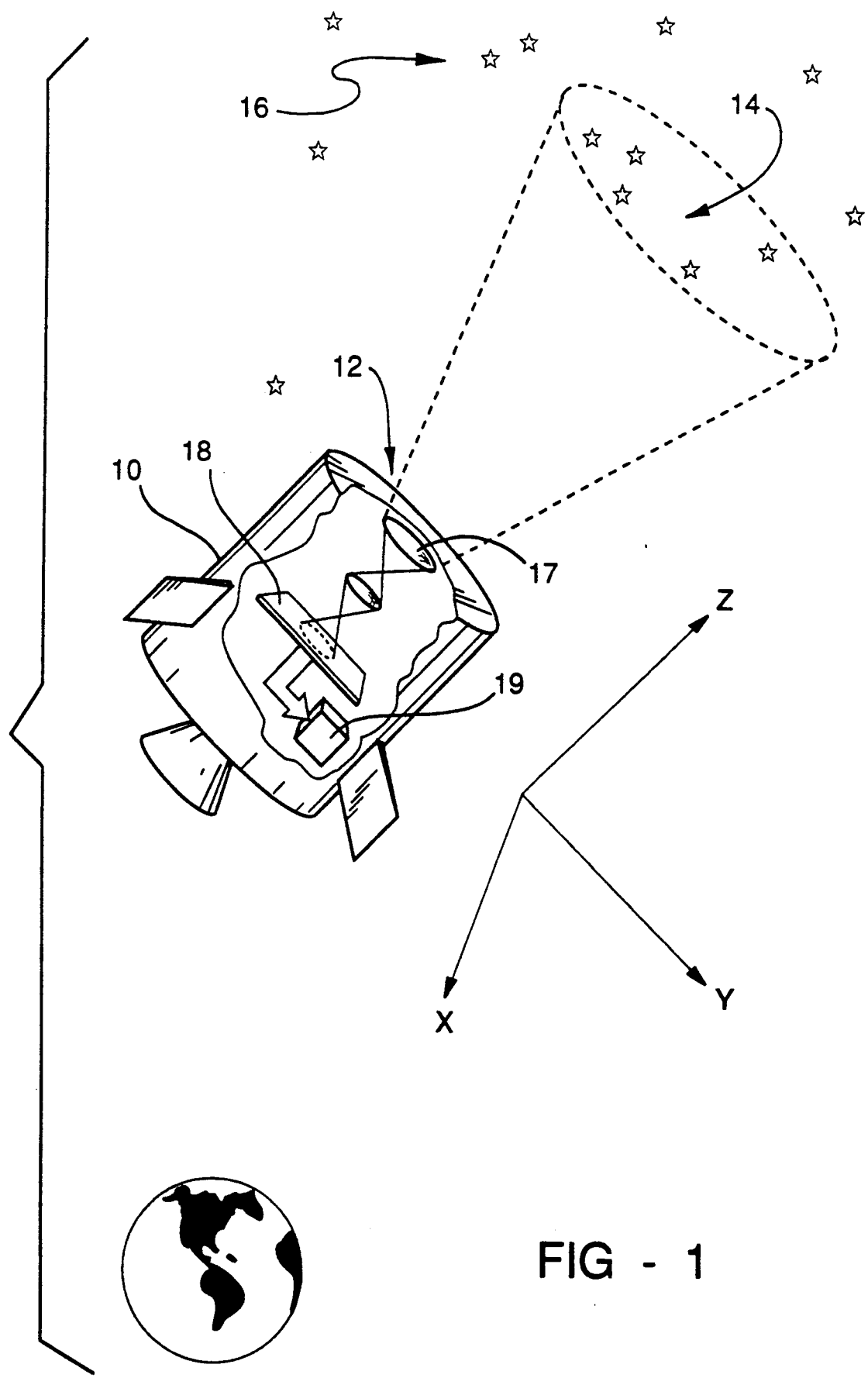
FIG. 1 is a pictorial representation of a satellite and its imaging device viewing a celestial sphere.

As can be seen in FIG. 1, the presently preferred embodiment is directed toward a method and apparatus for determining the rate of rotation of a rotating satellite orbiting the earth. Typically, as a satellite orbits around the earth, different portions of the heavens come into view. For example, persons in the northern hemisphere have a different view of the heavens than do persons in the southern hemisphere. That portion of the heavens associated with a particular orientation of the satellite with respect to the earth is commonly referred to as a celestial sphere. In the presently preferred embodiment, the satellite has an apparatus for determining the performance of the satellite by viewing the celestial sphere. More particularly, the satellite 10 has an imaging device, generally indicated at 12, for viewing a portion 14 of the celestial sphere 16 as the satellite 10 travels through its orbit. The imaging device 12 includes a lens assembly 17 for focusing the view of the celestial sphere 16 onto a detector array 18. The detector array is electronically linked to logic circuitry 19, where the logic circuitry 19 controls the taking of images and the computation of rotational rates. By comparing celestial views taken at different points in time, the method and apparatus of the present invention calculates the rotational rate of the satellite 10 about the X, Y, and Z axes.

Figure 2:
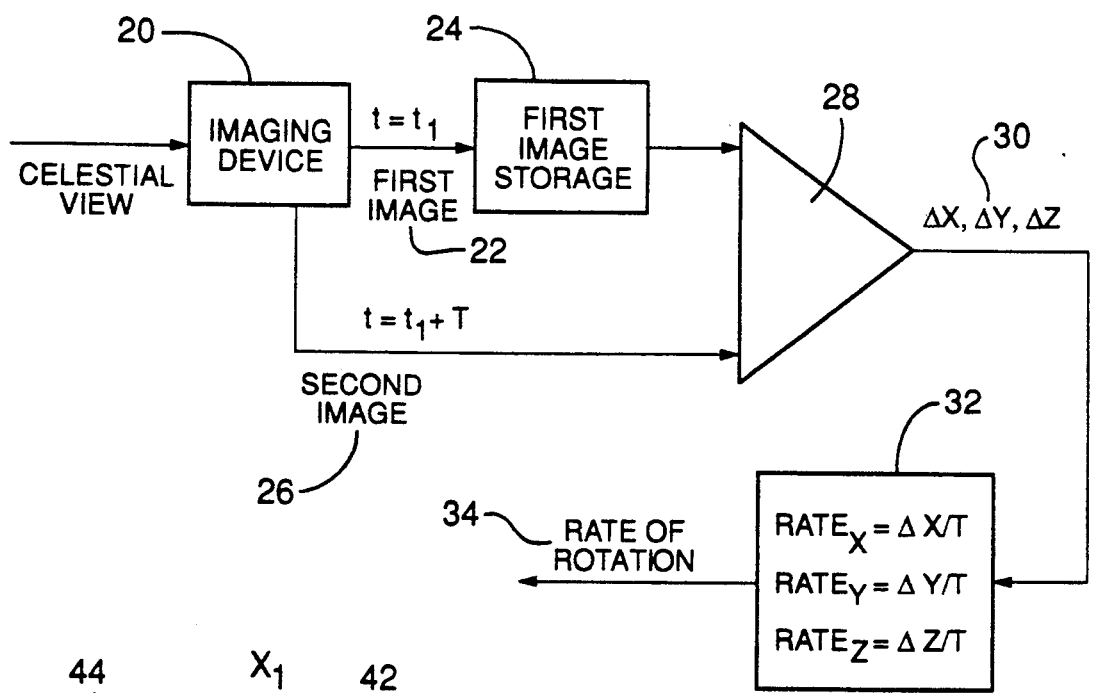
FIG. 2 is a functional block diagram illustrating the logic and computational methods used in this invention.

More particularly, as can be seen by referencing the functional block diagram of FIG. 2, the imaging device 20 is designed to focus on a portion of the celestial sphere 14. At a first point in time, denoted as $t_1$, a first celestial sphere image 22 is taken by the imaging device 20 and temporarily stored 24. At a second point in time, denoted as $t_1 + T$, a second image 26 is taken by the imaging device 20. The first 22 and second 26 images are compared 28 by the electronics of the imaging device and related circuitry, from which the relative movement along the X, Y and Z axis 30 can be determined. From these determined changes in relative positions, the rates of rotation about the X, Y and Z axis can be determined 32. Once the rates of rotation about the various axes are determined, an overall rate of rotation 34 can be determined, if desired.

Figure 3A:
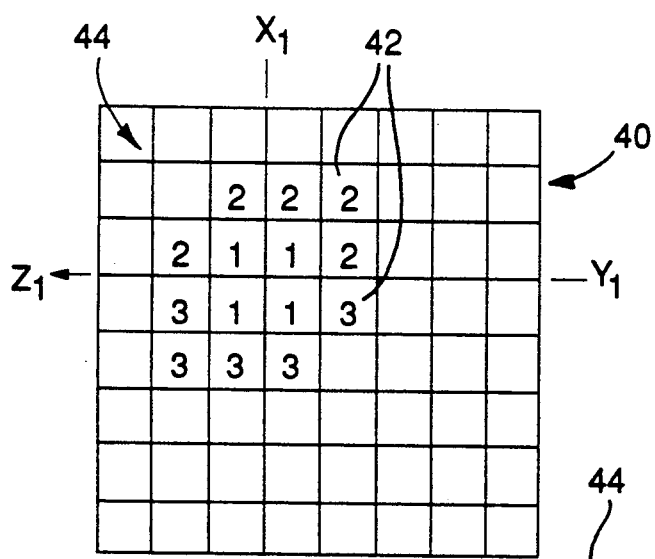
FIGS. 3A and 3B are symbolic representations of the celestial sphere view as captured by the imaging device at two different points in time.
Figure 3B:
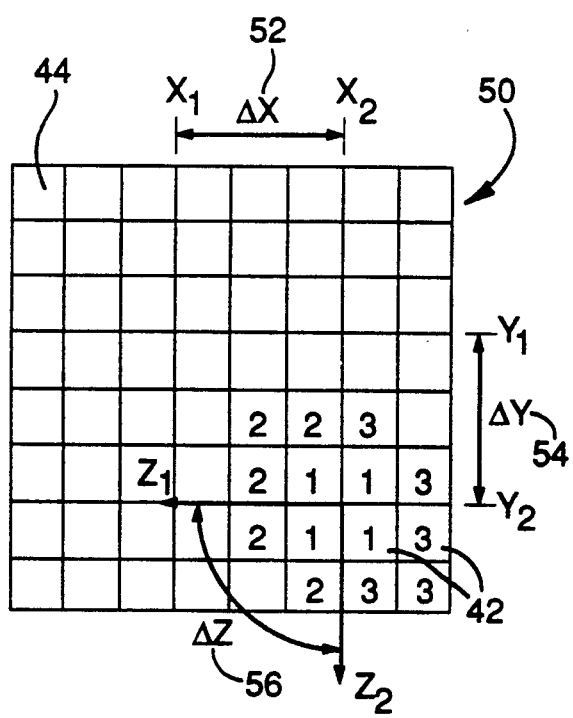

For example, as illustrated in FIGS. 3A and 3B, the first celestial view, generally indicated at 40, can be represented as a plurality of relative light levels 42 across a detector array 44. In this example, a low level of light is represented by a 3 while a high level of light is represented by a 1. It should be appreciated by those of ordinary skill in the art that such a detection array 44 could be made up of a CCD array or other detection means. This first celestial view image 40 taken at time $t = t_1$ has relative positional coordinates $X_1$ and $Y_1$ and an orientation in the X-Y plane here depicted as $Z_1$. This first image 40 is stored in the circuitry of the rate determination apparatus. At a second point in time, $t = t_1 + T$, a second image 50 is taken. As can be seen in FIG. 3B, the light incident upon the detection array 44 has similar intensity levels 42 as before, but the pattern created by the light has moved to position $X_2, Y_2$ and orientation $Z_2$. By comparing these relative coordinate movements, the relative X, Y and Z axis travel can be determined as $\Delta X$ 52, $\Delta Y$ 54 and $\Delta Z$ 56. Given that the time, T, between the first 40 and second 50 images is known, the apparent rates can be determined as:

$$\text{Rate}_x = \Delta X / T$$

$$\text{Rate}_y = \Delta Y / T$$

$$\text{Rate}_z = \Delta Z / T.$$

Comparing these apparent rates with the known orientation of the imaging device relative to the satellite axes, the satellite rotation rates about the X, Y, and Z axes can be determined. It should be appreciated by one of ordinary skill in the art that the time between successive views (T) can be equal to or relatively large in proportion to the scan rate of the detector array 44. For example, if a CCD array is employed having a $1,024 \times 1,024$ pixel detection array, being scanned at a rate of 1 KHz and having a lens assembly providing a one degree field of view for the detection array, taking sequential views of the celestial sphere provides a level of accuracy whereby rates from just under $\pm 0.001$ degrees per second to approximately $\pm 1,000$ degrees per second can be measured.

The preceding description of the presently preferred embodiment has been provided for the purposes of illustration only. It should therefore be appreciated by one of ordinary skill in the art that modifications could be made to this embodiment without departing from the spirit or scope of the invention disclosed herein.

What is claimed is:

1. A system for determining the rate of rotation of a rotating satellite, said system comprising:
    imaging means, located on the satellite, for recording first and second images of a celestial sphere, at first and second points in time, respectively; and
    processing means, associated with said imaging means, for determining a relative movement of the satellite between said first and second points in time by determining a difference between said first and second images.

2. The system of claim 1 wherein said processing means includes:
    storage means for storing said first recorded image until said second image has been recorded; and
    logic means for determining a difference between said stored first recorded image and said second recorded image and dividing said determined difference by the time between said first and second points in time to determine a relative movement of the satellite.

3. The system of claim 2 wherein said imaging means includes means for focusing views of the celestial sphere, wherein said imaging means records first and second focused view images at said first and second respective points in time.

4. The system of claim 3 wherein said imaging means includes a detector array element adapted to detect varying levels of light intensity and wherein said first and second recorded images are represented as arrays of discrete data representative of said detected varying light intensity.

5. The system of claim 1 wherein said imaging means includes means for focusing views of the celestial sphere, wherein said imaging means records first and second focused view images at said first and second respective points in time.

6. The system of claim 5 further comprising storage means, associated with said imaging means and said processing means, for storing said first recorded image, wherein said processing means determines the difference between said stored first recorded image and said second recorded image.

7. The system of claim 6 wherein said imaging means includes a detector array element adapted to detect varying levels of light intensity and wherein said first and second recorded images are represented as arrays of discrete data representative of said detected varying light intensity.

8. A method for determining the rate of rotation of a rotating satellite, said method including:
    focusing a first celestial sphere view onto an imaging device located on the satellite at a first period of time,
    recording an image of the first celestial sphere on the image device;
    focusing a second celestial sphere view onto said imaging device at a second period of time,
    recording an image of the second celestial sphere on the image device; and
    comparing said second and first recorded images to determine a relative movement of the satellite between said first and second periods of time.

9. The method of claim 8 wherein the satellite rotates about a first axis and wherein a second and third axis are perpendicular with respect to said first axis and with respect to each other, and wherein said comparison of said first and second celestial sphere images comprises:
    determining a first axis relative movement component between said first and second periods of time;
    determining a second axis relative movement component between said first and second periods of time; and
    determining a third axis relative movement component between said first and second periods of time.

10. The method of claim 8 further including storing said first cesestial sphere image in a temporary storage device and comparing said stored first celestial sphere image to said second celestial sphere image to determine said relative movement of the satellite between said first and second periods of time.

11. The method of claim 8 wherein said imaging device comprises a detector array and a lens assembly for focusing said first and second celestial sphere views onto said detector array.

12. The method of claim 11 wherein said detector array detects varying levels of light intensity and wherein said detector array records said first and second celestial sphere views as an array of discrete data representative of said detected varying light intensity.

13. A method for determining the relative rotation of a rotating satellite over a period in time, said method including:
    recording a first celestial sphere image at the beginning of the period in time;

recording a second celestial sphere image at the end of the period in time; and determining the relative rotation over the period in time by determining the difference between said first and second recorded images.

14. The method of claim 13 further including focusing views of a celestial sphere onto an imaging device, wherein said first and second recorded celestial sphere images are recordings of a first and a second focused celestial sphere view.

15. The method of claim 13 further including storing said first recorded celestial sphere image, wherein said determined relative rotation is the difference between said stored first recorded image and said second recorded image.

16. The method of claim 14 wherein said imaging device comprises a detector array adapted to detect varying levels of light intensity and wherein a lens assembly focuses said first and second celestial sphere images onto said detector array.

17. The method of claim 16 wherein said first and second recorded celestial sphere images are recorded by said detector array as an array of discrete data representative of said detected varying light intensity.

* * * * *